United States Patent [19]

Komatsu

[11] Patent Number: 4,826,234
[45] Date of Patent: May 2, 1989

[54] STEERING ASSEMBLY SUPPORTING STRUCTURE OF A MOTOR VEHICLE

[75] Inventor: Nobuhiro Komatsu, Hiroshima, Japan

[73] Assignee: Mazda Motor Corporation, Hiroshima, Japan

[21] Appl. No.: 100,790

[22] Filed: Sep. 25, 1987

[30] Foreign Application Priority Data

Sep. 26, 1986 [JP] Japan ............... 61-225884
Sep. 26, 1986 [JP] Japan ............... 61-146458[U]

[51] Int. Cl.⁴ ............... B62D 25/14; B62D 1/16; B60R 27/00; F16B 9/00
[52] U.S. Cl. ............... 296/70; 280/779; 296/192; 296/202; 403/167
[58] Field of Search ............... 296/192-194, 296/203, 70, 202; 280/779; 180/90; 74/492; 248/251; 403/167, 168, 199, 187

[56] References Cited

U.S. PATENT DOCUMENTS

| 949,194 | 2/1910 | Myer | 403/167 X |
| 2,978,055 | 4/1961 | Barenyi | 180/90 X |
| 4,362,331 | 12/1982 | Harasaki et al. | 296/194 |
| 4,432,565 | 2/1984 | Suzuki et al. | 280/779 |

FOREIGN PATENT DOCUMENTS 60-31960 9/1985 Japan.

Primary Examiner—Robert J. Oberleitner
Attorney, Agent, or Firm—Gerald J. Ferguson, Jr.

[57] ABSTRACT

A vehicle body has left and right front pillars, each formed of an inner panel and an outer panel and having a closed cross-section, and a dashboard upper panel extending in the transverse direction of the vehicle body between the left and right front pillars. A steering shaft support member which supports a steering shaft and extends in the transverse direction of the vehicle body is connected to the corresponding front pillar at each end thereof by way of a bracket which forms a closed cross-section together with the corresponding front pillar.

11 Claims, 7 Drawing Sheets

STEERING ASSEMBLY SUPPORTING STRUCTURE OF A MOTOR VEHICLE

BACKGROUND OF THE INVENTION

1. Field of the Invention

This invention relates to a front structure of a vehicle body, and more particularly to an improvement in a structure for connecting each end of a steering shaft support member transversely extending between left and right front pillars with the corresponding front pillar.

2. Description of the Prior Art

In Japanese Utility Model Publication 60(1985)-31960, there is disclosed a structure in which a steering shaft is mounted on a steering shaft support member transversely extending between left and right front pillars in order to repress vibration of the steering wheel when traveling over uneven surfaces and increase the supporting rigidity of the steering shaft in a collision. In this structure, though each end of the steering shaft support member is connected to the corresponding front pillar by way of a bracket, vibration of the steering wheel cannot be satisfactorily prevented since the rigidity of the part associated with the front pillar is insufficient.

Though the rigidity of the part associated with the front pillar can be increased by connecting a cowl portion to the front pillar to form a closed cross-section as disclosed in Japanese Unexamined Utility Model Publication No. 58(1983)-149258, this structure cannot contribute largely to repression of vibration of the steering wheel.

SUMMARY OF THE INVENTION

In view of the foregoing observation and description, the primary object of the present invention is to provide an improved front structure of a vehicle body in which the part associated with the front pillar to which the steering shaft support member is connected is increased in rigidity.

In accordance with the present invention, there is provided a front structure of a vehicle body comprising left and right front pillars, each formed of an inner panel and an outer panel and having a closed cross-section, and a dashboard upper panel extending in the transverse direction of the vehicle body between the left and right front pillars wherein, a steering shaft support member which supports a steering shaft and extends in the transverse direction of the vehicle body is connected to the corresponding front pillar at each end thereof by way of a bracket which forms a closed cross-section together with the corresponding front pillar.

The closed cross-section formed by the front pillar and the bracket increases the rigidity of the part associated with the front pillar and vibration of the steering shaft is effectively repressed.

DESCRIPTION OF THE PREFERRED EMBODIMENTS

Figure 1:
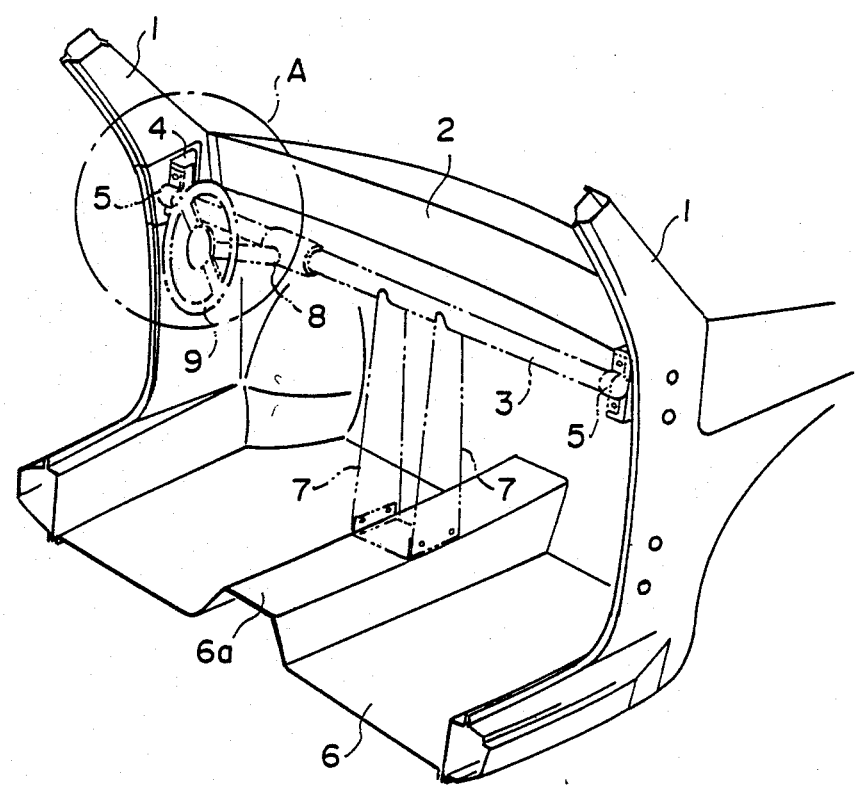
FIG. 1 is a schematic perspective view showing a first embodiment of the present invention.

In FIG. 1, left and right front pillars 1 are provided on the left and right side of the front portion of a vehicle body. A dashboard upper panel 2 extends between the left and right front pillars 1. A steering shaft support member 3 for supporting a steering shaft 8 extends between the left and right front pillars 1. Each end of the steering shaft support member 3 is fixed to the corresponding front pillar 1 by bolting a clamp bracket 5 to a bracket 4 welded to the front pillar 1. The central portion of the steering shaft support member 3 is connected to the top ends of a pair of reinforcements 7 which are fixed to a raised portion 6a of a floor 6 at the lower ends and extend vertically upward. Reference numeral 9 denotes a steering wheel.

Figure 2:
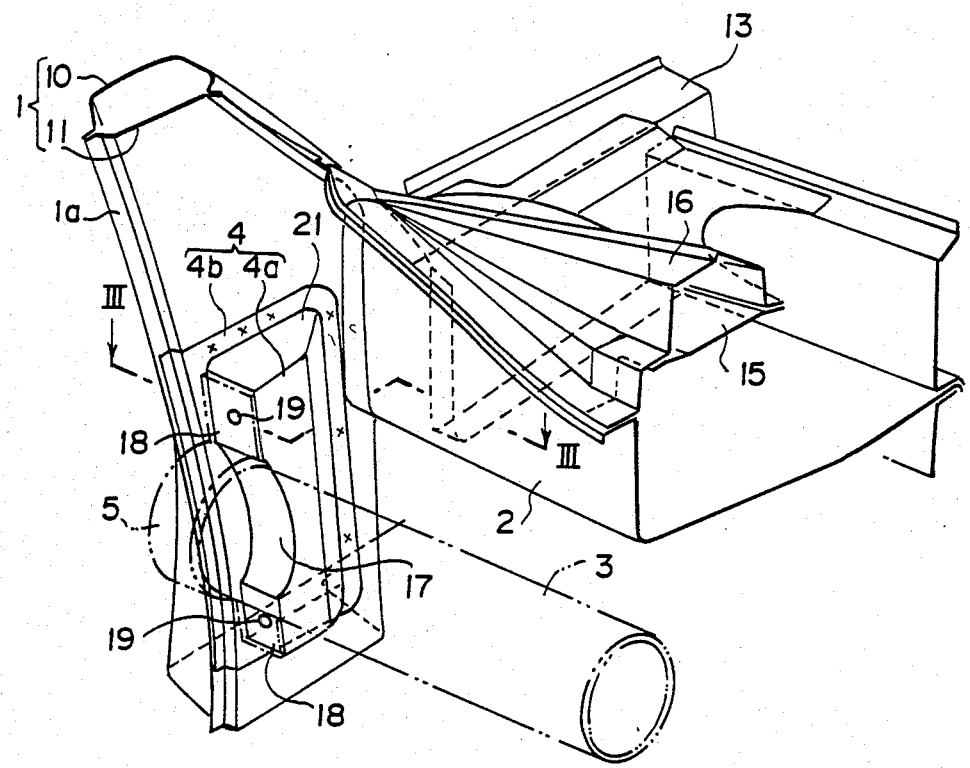
FIG. 2 is an enlarged cross-sectional view of a part of FIG. 1.
Figure 3:
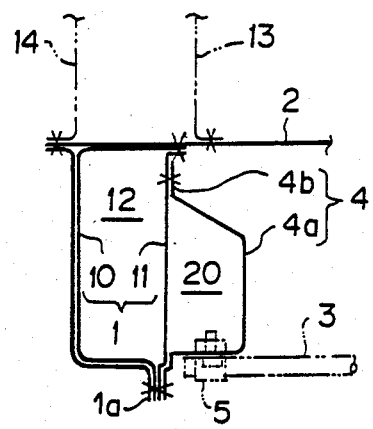
FIG. 3 is a schematic cross-sectional view taken along line III—III in FIG. 2.

FIG. 2 is an enlarged perspective view showing the connection of the steering shaft support member 3 to the left front pillar 1 (the part surrounded by circle A in FIG. 1), and FIG. 3 is a schematic cross-sectional view taken along line III—III in FIG. 2.

In FIGS. 2 and 3, the front pillar 1 comprises an outer panel 10 and an inner panel 11 connected together to form a closed cross-section 12. The rear edges of the outer and inner panels 11 and 12 are welded together at a flange portion 1a of the front pillar 1. The dashboard upper panel 2 is welded (in FIGS. 2 and 3, X indicates a welding point) to the front edge of the front pillar 1, and a cowl plate upper 13 and a wheel apron reinforcement 14 are connected to the dashboard upper panel 2 to form a closed cross-section together therewith and extend forward to the position of a front wheel suspension tower to ensure longitudinal strength of the front side portion of the vehicle body. A mount member lower 15 and a mount member upper 16 for mounting a windshield are connected to the upper portion of the dashboard upper panel 2.

The bracket 4 for mounting the end of the steering shaft support member 3 is press-formed from a single piece of steel plate, and comprises a central bulge portion 4a and a peripheral flange portion 4b surrounding the bulge portion 4a. An arcuate recess 17 for receiving the end of the steering shaft support member 3 is formed on the outer rear end surface of the bulge portion 4a, and upper and lower vertical surfaces 18 for mounting the clamp bracket 5 are formed above and below the arcuate recess 17. Reference numeral 19 denotes a threaded hole formed in the vertical surface 18. Further, the bulge portion 4a has a flat top surface 21. The flange portion 4b of the bracket 4 is welded to the inner panel 11 of the front pillar 1 with the rear edge portion of the flange portion 4b welded to the flange portion 1a of the front pillar 1. With the connection of the bracket 4 to the front pillar 1 described above, a closed cross-section 20 is formed between the bulge portion 4a of the bracket 4 and the inner panel 11 of the front pillar 1, and the rigidity of the part associated with the front pillar 1 to which the end of the steering shaft support member 3 is connected, whereby vibration of the steering wheel 9 is repressed.

Figure 4:
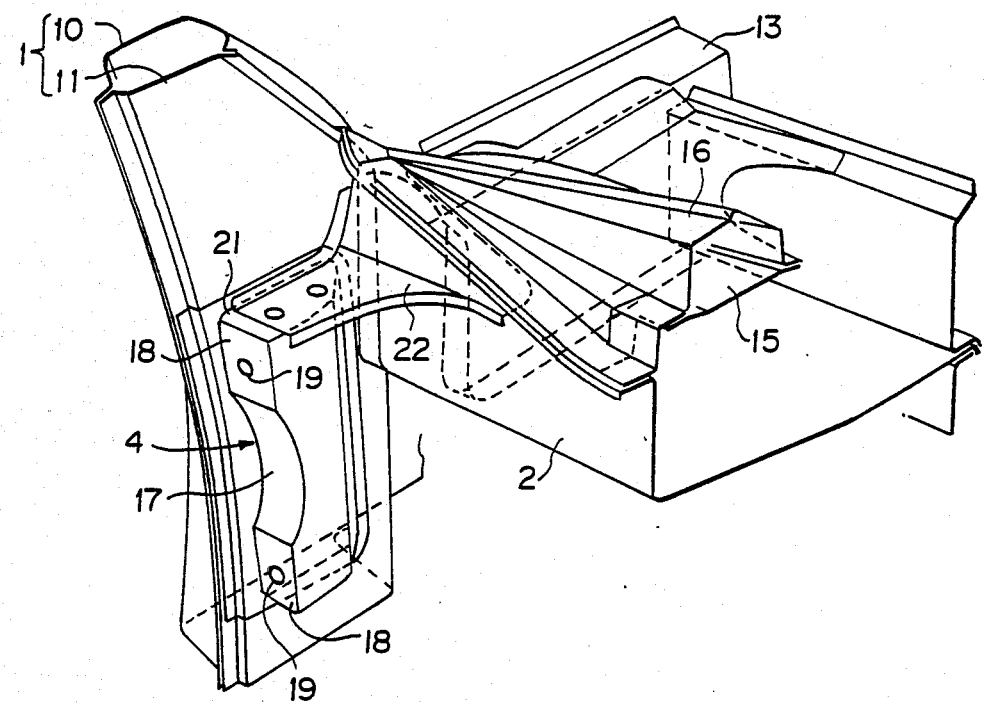
FIG. 4 is a view similar to FIG. 2 but showing a modification of the first embodiment.

If necessary, the junction of the mount panel lower 15, the mount panel upper 16 and the dashboard upper panel 2 may be connected to the flat top surface 21 of the bracket 4 by a brace element 22 in order to further increase the rigidity of the part associated with the front pillar 1 as shown in FIG. 4.

Figure 5:
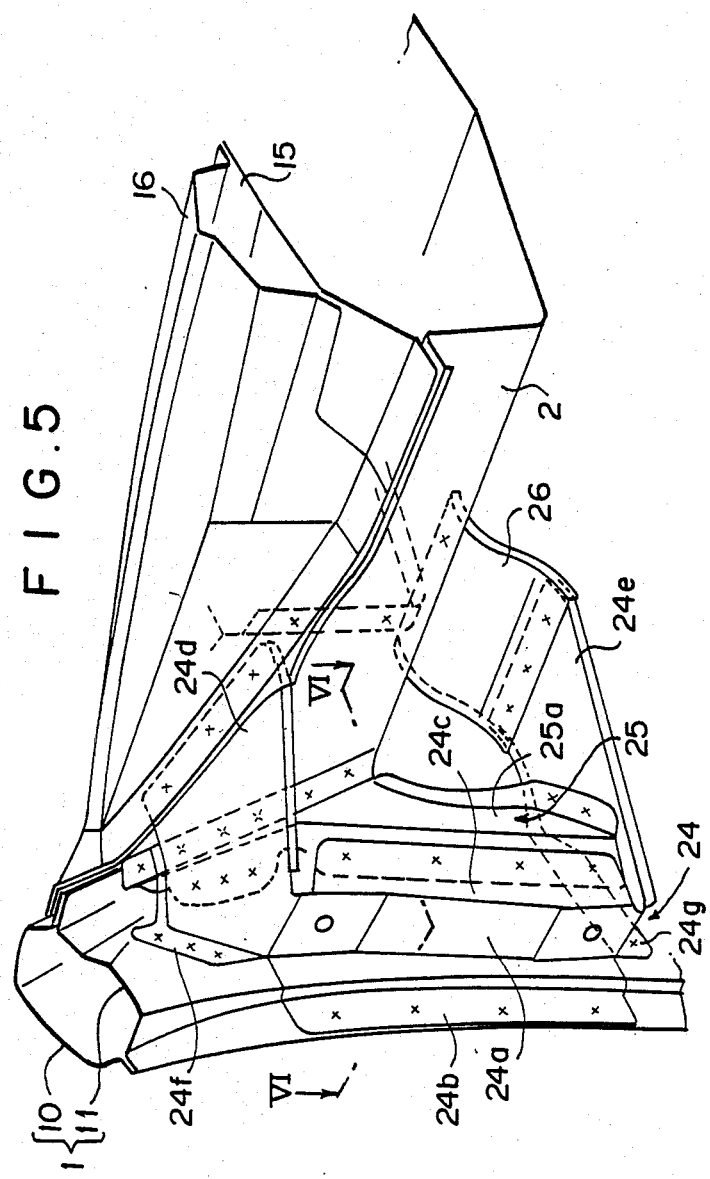
FIG. 5 is a view similar to FIG. 2 but showing a second embodiment of the present invention.
Figure 6:
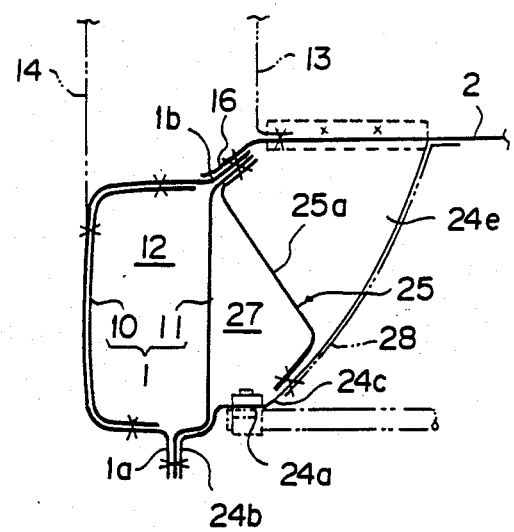
FIG. 6 is a schematic cross-sectional view taken along line VI—VI in FIG. 5.
Figure 7:
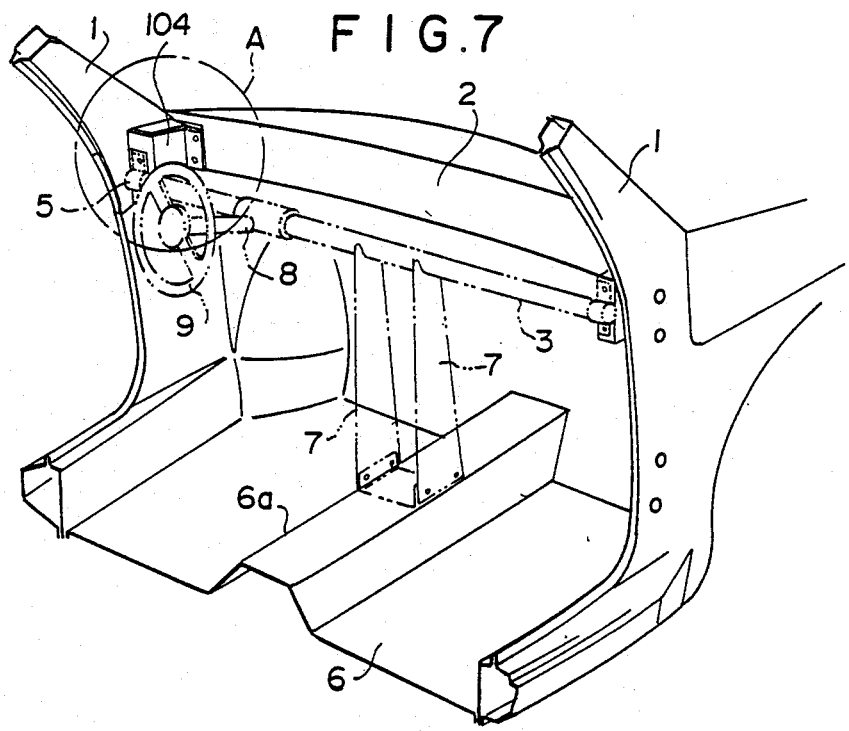
FIG. 7 is a view similar to FIG. 1 but showing a third embodiment of the present invention.
Figure 8:
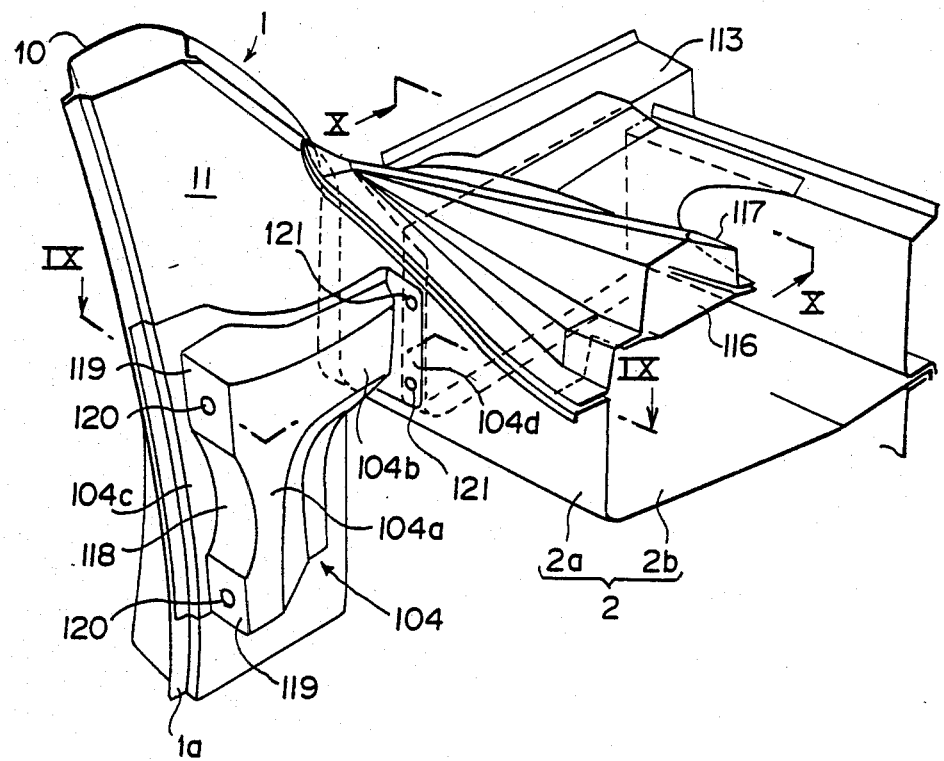
FIG. 8 is an enlarged cross-sectional view of the part surrounded by circle A in FIG. 7, FIGS. 9 and 10 are cross-sectional views respectively taken along lines IX—IX and X—X in FIG. 8.
Figure 9:
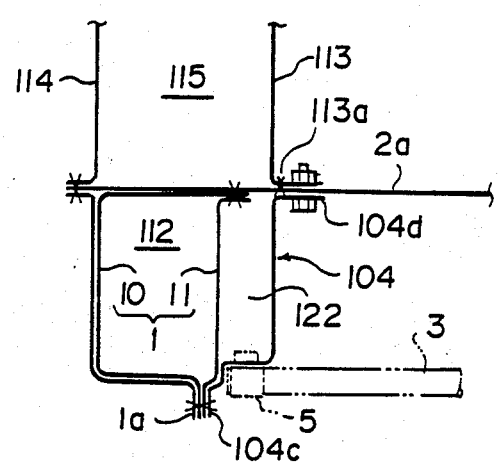
Figure 10:
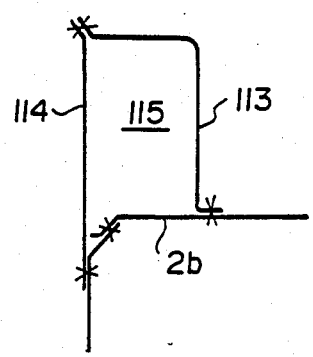

In another embodiment of the present invention shown in FIGS. 5 and 6, the bracket for fixing the end of the steering shaft support member 3 to the front pillar 1 comprises first and second bracket havles 24 and 25 welded together. The first bracket half 24 comprises a vertical wall portion 24a on which the end of the steering shaft support member 3 is mounted, a flange portion 24b bent rearward from the left side edge of the vertical wall portion 24a and welded to the flange portion 1a of the front pillar 1, a flange portion 24c bent obliquely forward from the right side edge of the vertical wall portion 24a, and upper and lower horizontal flange portions 24d and 24e extending horizontally forward respectively from the upper and lower ends of the vertical wall portion 24a. The upper horizontal flange portion 24d is provided with a flange portion 24f which is bent upward from the left side edge of the upper horizontal flange portion 24d and is welded to the inner panel 11 of the front pillar 1. The front end portion of the upper horizontal flange portion 24d is connected to the junction of the dashboard upper panel 2, the mount member lower 15 and the mount member upper 16. The lower horizontal flange portion 24e is provided with a flange portion 24g which is bent downward from the left side edge thereof and is welded to the inner panel 11 of the front pillar 1. The front end of the lower horizontal flange portion 24e is connected to the lower surface of the dashboard upper panel 2 by way of a brace element 26. The second bracket half 25 is welded to the first bracket half 24 to form a closed cross-section 27 together with the vertical wall portion 24a and the upper and lower horizontal flange portion 24d and 24e of the first bracket half 24 and the inner panel 11 of the front pillar 1. The second bracket half 25 has a vertical wall portion 25a and flanges which are formed around the vertical wall portion 25a and are respectively connected to the flange portions 24c, 24d and 24e of the first bracket half 24 and the flange portion 1b of the front pillar 1. Thus, in this embodiment, the closed cross-section 27 defined by the first and second bracket halves 24 and 25 and the inner panel 11 of the front pillar 1 increases the rigidity of the part associated with the front pillar 1 to which the end of the steering shaft support member 3 is connected, whereby vibration of the steering wheel is repressed.

If necessary, the rigidity of the part associated with the front pillar 1 can be further increased by providing, as shown by the chained line in FIG. 6, an additional bracket 28 which is welded at the peripheral edge thereof to the flange portions 24c, 24d and 24e of the first bracket 24 and the dashboard upper panel 2 to form a closed cross-section.

FIGS. 7 to 10 show still another embodiment of the present invention. This embodiment is very similar to that shown in FIGS. 1 to 3, and accordingly, it is the difference therebetween that will be mainly described hereinbelow. That is, in this embodiment, the dashboard upper panel 2 comprises a vertical wall portion 2a and a horizontal wall portion 2b horizontally extending forward from the lower edge of the vertical wall portion 2a and the front edge of the front pillar 1 is welded to the vertical wall portion 2a as clearly shown in FIG. 9. A cowl plate upper 113 and a wheel apron reinforcement 114 are connected to the dashboard upper panel 2 to form a closed cross-section 115 together with the horizontal wall portion 2b of the dashboard upper panel 2 as can be seen from FIG. 10 and extend forward to the position of a front wheel suspension tower (not shown) to ensure strength of the front side portion of the vehicle body. A mount member lower 116 and a mount member upper 117 for mounting a windshield are connected to the upper portion of the dashboard upper panel 2.

The bracket 104 for mounting the end of the steering shaft support member 3 is press-formed from a single piece of steel plate, and comprises a bulge portion 104a, an extension 104b extending forward from the bulge portion 104a and a flange portion 104c surrounding the bulge portion 104a. An arcuate recess 118 for receiving the end of the steering shaft support member 3 is formed on the rear end surface of the bulge portion 104a, and upper and lower vertical surfaces 119 for mounting the clamp bracket 5 are formed above and below the arcuate recess 118. Reference numeral 120 denotes a threaded hole formed in the vertical surface 119. The bracket 104 is welded to the inner panel 11 of the front pillar 1 at the flange portion 104c with the rear edge portion of the flange portion 104c being welded to the flange portion 1a of the front pillar 1. On the front edge of the extension 104b is formed a flange portion 104d which is bent laterally by substantially 90° and is provided with a pair of mounting holes 121. As can be seen from FIG. 9, the cowl plate upper 13 is welded to the vertical wall portion 2a of the dashboard upper panel 2 at a flange portion 113a which is formed on the rear edge thereof and is bent laterally. The flange portion 104d of the bracket 104 is positioned on the vertical wall portion 2a of the dashboard upper panel 2 to overlap with the flange portion 113a of the cowl plate upper 113 with the vertical wall portion 2a intervening therebetween and is bolted on the flange portion 113a.

As can be understood from the description above, since a closed cross-section 122 is formed by the bracket 104, the inner panel 11 of the front pillar 1 and the vertical wall portion 2a of the dashboard upper panel 2 on the rear side of the vertical wall portion 2a and is connected with the closed cross-section 115 on the front side of the vertical wall portion 2a, the rigidity of the part associated with the front pillar 1 is highly increased.

Figure 11:
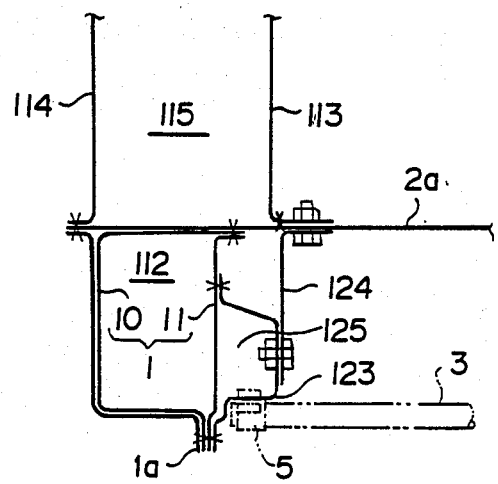
FIG. 11 is a view similar to FIG. 9 but for illustrating a modification of the third embodiment.

FIG. 11 shows a modification of the preceding embodiment. In this modification, the bracket for mounting the steering shaft support member 3 comprises a first bracket half 123 which is welded to the inner panel 11 of the front pillar 1 and forms the body portion of the bracket, and a second bracket half 124 which is connected to the first bracket half 123 and forms a forward extension of the bracket. The first bracket half 123 forms a closed cross-section 125 together with the inner panel 11 of the front pillar 1. The second bracket half 124 is connected to the cowl plate upper 113 with the vertical wall portion 2a of the dashboard upper panel 2 sandwiched therebetween. This arrangement, together with the fact that the cowl plate upper 113 forms a closed cross-section 115 together with the dashboard upper panel 2 and the wheel apron reinforcement 114, increases the rigidity of the part associated with the front pillar 1 to which the end of the steering shaft support member 3 is connected.

I claim:

1. A front structure of a vehicle body comprising left and right front pillars, each formed of an inner panel and an outer panel and having a closed cross-section, and a dashboard upper panel extending in the transverse direction of the vehicle body between the left and right front pillars wherein, a steering shaft support member which supports a steering shaft and extends in the transverse direction of the vehicle body is connected to the corresponding front pillar at each end thereof by way of a bracket which forms a closed cross-section together with the corresponding front pillar, wherein said bracket comprises a central bulge portion and a flange portion around the central bulge portion, said bracket further comprises an arcuate recess for receiving the end of the steering shaft support member formed on the rear end surface of the bulge portion and upper and lower vertical surfaces for mounting a clamp bracket formed thereon above and below the arcuate recess.

2. A front structure as defined in claim 1 in which the rear edge of the flange portion of said bracket is connected to a flange portion of the front pillar at which the rear edges of the inner and outer panels are connected together.

3. A front structure as defined in claim 1 in which said bracket is connected to the dashboard upper panel at the front edge thereof.

4. A front structure as defined in claim 3 in which said bulge portion of the bracket has a flat top surface which is connected with the dashboard upper panel and a windshield mount member by way of a brace element.

5. A front structure as defined in claim 4 in which said brace element is connected between the flat top surface of the bulge portion of the bracket and the junction of the windshield mount member and the dashboard upper panel.

6. A front structure as defined in claim 3 in which said bracket has a forward extension and is connected to the dashboard upper panel at the forward extension.

7. A front structure as defined in claim 6 in which the front end of said forward extension of the bracket is connected to a cowl plate upper which extends forward from the front pillar and forms a closed cross-section together with the dashboard upper panel and a wheel apron reinforcement.

8. A front structure as defined in claim 7 in which said front end of the forward extension of the bracket is provided with a flange portion laterally bent substantially by 90° and having a mounting hole.

9. A front structure as defined in claim 7 in which the rear edge of the cowl plate upper is provided with a flange portion bent laterally and having a mounting hole, and the dashboard upper panel has a vertical wall portion, the cowl plate upper being connected to the vertical wall portion of the dashboard upper panel at the flange portion.

10. A front structure as defined in claim 9 in which said front end of the forward extension of the bracket is provided with a flange portion laterally bent substantially by 90° and having a mounting hole, and the flange portion of the forward extension of the bracket is bolted onto the flange portion of the cowl plate upper with the vertical wall portion of the dashboard upper panel sandwiched therebetween.

11. A front structure of a vehicle body comprising left and right front pillars, each formed of an inner panel and an outer panel and having a closed cross-section, and a dashboard upper panel extending in the transverse direction of the vehicle body between the left and right front pillars wherein, a steering shaft support member which supports a steering shaft and extends in the transverse direction of the vehicle body is connected to the corresponding front pillar at each end thereof by way of a bracket which forms a closed cross-section together with the corresponding front pillar, wherein said bracket has a bulge portion and the steering shaft support member is attached by a fixing means to an outer rear end surface of said bulge portion, said rear end surface extending in the transverse direction of the vehicle body.

* * * * *